UNITED STATES PATENT OFFICE.

GEORGE W. McMULLEN AND GEORGE BARRETT McMULLEN, OF PICTON, ONTARIO, CANADA, ASSIGNORS, BY MESNE ASSIGNMENTS, TO ZALMON G. SIMMONS, OF KENOSHA, WISCONSIN, ANDREW W. PRESTON, OF SWAMPSCOTT, MASSACHUSETTS, AND BRADLEY W. PALMER, OF BOSTON, MASSACHUSETTS, TRUSTEES.

PROCESS OF MAKING SUGAR AND BY-PRODUCTS FROM SUGAR-CANE.

1,040,560.

Specification of Letters Patent. Patented Oct. 8, 1912.

No Drawing. Application filed January 9, 1911. Serial No. 601,569. REISSUED

*To all whom it may concern:*

Be it known that we, GEORGE W. McMULLEN and GEORGE BARRETT McMULLEN, both citizens of the United States, and residents of Picton, in the Province of Ontario, Dominion of Canada, have invented a certain new, useful, and Improved Process of Making Sugar and By-Products from Sugar-Cane, of which the following is a specification.

This invention relates to an improved process of making sugar and by-products from sugar cane.

Among the salient objects of the present invention are to provide a process whereby the sugar cane may be converted into a condition adapted for indefinite preservation in the immediate vicinity where it is grown and as soon as it is harvested, so that all losses by inversion of sugar and spoiling are eliminated and the subsequent extraction of the sugar and refining of the same may be accomplished under the most advantageous conditions both as to economy and yield; to provide a process by means of which the sugar is extracted from the cane product in a higher degree of purity with a consequent reduction in cost of subsequent refinement; to provide a process by means of which the plant material is first dried and afterward extracted by dissolving out the sugar and in so doing a heavier or more concentrated solution of sugar secured than is practicable where the extracted material is very green cane, thus effecting a substantial economy in the subsequent refining and evaporation of the sugar bearing solution; to provide a process which enables the sugar bearing product before being extracted to be preserved indefinitely and to be shipped without deterioration from place to place, thus securing the advantages of manufacture where conditions are best suited; to provide a process which results in leaving the extracted structural parts of the plant in the form of by-products in ideal condition for utilization in paper making or other uses for which cellulose is utilized; to provide a process which, so far as its desiccating steps are concerned, is susceptible to being carried out on a large scale with great rapidity and very largely by the use of automatic machinery, so that immense quantities of sugar cane may be converted into condition for preservation at the very time when the crop is in prime condition for harvesting; to provide a process by means of which substantially 100% of the sugar contained in the plant may be extracted without undue expense or repetition of steps; and in general to provide an improved process of the character referred to.

To the above ends the invention consists in the matters hereinafter described and more particularly pointed out in the appended claims.

The invention will be readily understood from the following description, wherein the process is described as carried out by the use of ordinary well understood and readily available accessories.

In practising this invention the sugar cane is first threaded or disintegrated into finely divided condition, i. e., into such condition that the shell and fibro-vascular portions are in the form of fine filaments and the pith in the form of small particles somewhat resemble wet saw-dust. It will be understood that the cane is harvested, as usual, when it is as nearly as possible in prime condition for sugar making.

In the operation of shredding any juices which may be expressed are re-absorbed by the shredded mass.

Such shredding of the cane may be successfully carried out by the use of a machine in principle like that shown and described in Patent No. 813,500 granted to J. W. Hyatt, February 20, 1906, but any other suitable mechanism which will accomplish the described shredding may be used. It is important that the shredding be performed with reasonable promptness after the cane has been harvested, because wherever the stalks are severed or mutilated so as to expose the interior inversion begins in a short time with a consequent loss of crystallizable sugar.

Promptly after the shredding the material is dried, and this drying must be effected in artificially heated driers, in order that it may be accomplished rapidly, under controlled conditions, and inversion and deterioration of the product thus avoided. To this end the drying is preferably conducted in drying kilns through which the material is passed progressively, and while so passing through the kiln is subjected to the drying action of a heated drying medium as hot air circulated through the kiln, the material being sufficiently agitated or tumbled to insure complete and substantially uniform access to all parts thereof. For purposes of economy it is of course necessary that the drying should be approximately uniform so that no part of the material is left undried and no part subjected to the drying operation much longer than necessary. These results are readily attained by passing the material through a kiln equipped with traveling drier belts over which the material passes progressively while the hot air is circulating around and through it. The drying is conducted at a temperature in the material being dried ranging from 100 degrees to 200 degrees Fahrenheit; the hot gas being circulated through in such volumes as to carry away the moisture-laden vapor practically as fast as formed, and the material, as hereinbefore described, so manipulated as to be thoroughly subjected to such drying action as to all its parts. These conditions all contribute to rapid and uniform drying, which is important in order to avoid inversion and deterioration of the material, but the temperature of the material must nevertheless not be carried too high, especially during the later stages of the drying, in order to avoid caramelization.

A characteristic result of thus shredding the cane into finely disintegrated condition and then effecting a prompt and relatively rapid extraction of the moisture down to a degree of dryness in which the material is adapted for indefinite preservation under exposure to ordinary atmospheric conditions is that when the material is subjected to soaking with water, as it is afterward in the extracting step, the sugar is dissolved and passes into solution almost instantly and before other less soluble constituents are dissolved. Undoubtedly the crystallizing of the sugar in the material during drying separates the sugar more or less perfectly from the so-called impurities, so that, taken in conjunction with the finely comminuted condition in which the material exists when subjected to the extracting step, the very perfect extraction and high degree of purity, hereinafter described, are secured. To attain these results it is preferred that the moisture in the material should be reduced below thirty per cent., and preferably to six to twelve per cent.

Sugar cane, as hereinbefore intimated, contains two distinctly different characteristic structural parts, namely the pith material, and the woody fibrous material. Both of these materials are composed largely of cellulose, i. e., plant cells which when separated from the intercellular material, yield so-called ultimate fiber. The cellulose or ultimate fiber derived from the pith is of very different character from that derived from the shell and fibro-vascular filaments, i. e., the woody fibers. For commercial utilization of these two cellulose products it is practically essential that they be separated from each other and not used in their mixed condition as found in the plant. The extracted plant material is a by-product of considerable value and more valuable when the pith and woody fibers are separated. Moreover the separation of the two forms of plant structure facilitates the drying when certain types of apparatus are used, and the separated materials may be extracted somewhat more economically than when mixed. It is not essential to the main object of the present process, namely the securing of the chief product,—the sugar, that the pith and wood fiber be separated, since it is a fact that the shredded material can be dried effectively without separation and can be extracted effectively without separation.

Preferably, for reasons above explained, the shredded material is separated into its two chief structural parts, and according to the type of drier employed this separation may be accomplished either before or after drying. To effect the separation of the mass, after it has been shredded, resort is had to a screening or sifting operation; the screening or sifting being usually accomplished in case the separation precedes the drying as a continuous operation to which the material is subjected while passing from the shredder on its way to the drying kilns. Preferably the material is caused to pass over and through a series of ordinary wire screens of suitable mesh, the material passing over screens of successively finer mesh and the two products so separated being conveyed to different kilns.

The screens may be agitated or rotated in any of the well known ways, and are usually arranged in inclined position so that the filamentary fiber passes over the screens and the pith material passes through them. The screening may of course be performed manually, in which case the material is placed upon the screens and the pith particles sifted out in batches, much in the manner that the house-wife dredges flour. Commercially, however, it is practically necessary to employ a machine so organized as to accomplish the separation progressively and on a comparatively large scale.

The degree of separation or concentration of the respective fractions is such as may be attained by screening under the described conditions, and should be adequate to secure the advantages herein pointed out.

The pith product on the one hand and the fibrous product on the other each possesses its original proportions of the natural gar juices, and owing to the different character of the two products they may be dried in slightly modified and specially adapted kilns more rapidly and more uniformly than when the material is dried in its mixed condition.

The separation by screening, may, however, be accomplished after the material has been dried, or for that matter, while passing through the driers, since the drying, if accomplished in the manner described, does not permit the material to mat or adhere together, and the saw-dust like pith material may be readily screened out from the filamentary woody shreds. The separation of the dried material may be accomplished by sifting and screening in substantially the same manner as that described for accomplishing the same end before drying. Subsequently the sugar contents of the dried material are dissolved or diffused out. Owing to the degree of comminution of the material and to the effects of the previous drying, the solution of the sugar proceeds with great rapidity.

The extraction is preferably accomplished by placing the material in a centrifugal device of any proper construction after the material has been thoroughly wet with water or dilute sugar juices. The action of this machine throws out promptly the liquid containing the dissolved sugar. A subsequent stream of water thrown into the material in this machine thoroughly washes it and eliminates practically the last traces of sugar.

The sugar is recovered from the sugar solution thus extracted in any usual and well understood manner, involving of course the evaporation of the liquid and crystallizing out of the sugar.

The extracted plant material is in ideal condition for utilization for paper making or for other purposes to which cellulose stock is adapted. The fact that the sugar has been completely removed from the material obviates a serious difficulty heretofore encountered in the making of cellulose chemical fiber from sugar cane, in that the drastic chemicals used in effecting the reduction or cooking of the material has heretofore acted upon the sugar left in the imperfectly extracted cane to form dark colored carbonaceous products and so produce a coloring matter extremely difficult if not impossible of removal. Moreover, where the cellulose is desired for conversion into nitro-cellulose the presence of sugar renders the reduction to nitro-cellulose highly dangerous. Again, the finely comminuted and extracted form in which this by-product is left after extraction substantially cheapens and shortens the time necessary to effect complete chemical reduction to ultimate fiber, and this is accounted for by the fact that the chemical directly attacks the intercellular matter and is not wasted upon those water soluble contents which have been removed. It is probable also that the uniformly fine condition into which the material is shredded both hastens and uniforms the cooking operation, thus not only effecting economy but securing a maximum yield of ultimate fiber because of the uniformity with which the reduction is effected.

We claim as our invention:

1. The process of making sugar and by-products from sugar-cane which consists in shredding sugar-cane to a condition in which the pith is torn free from the woody fiber and fibro-vascular filaments so that the pith may be substantially segregated, either simultaneously or in any order of sequence, extracting the sugar by dissolving it out from the respective fractions with a suitable solvent and then recovering the sugar from the solvent.

2. The process of making sugar and by-products from sugar-cane, which consists in shredding the sugar-cane to a condition in which the pith is torn free from the woody fiber and fibro-vascular filaments so that the pith may be substantially segregated, drying the shredded mass and thereafter concentrating the pith and fiber constituents thereof, extracting the sugar by dissolving it out from the respective fractions with a suitable solvent, and then recovering the sugar from the solvent.

3. The process of making sugar and by-products from sugar-cane which consists in shredding sugar-cane to a condition in which the pith is torn free from the woody fiber and fibro-vascular filaments, so that the pith may be substantially segregated by screening, thereafter effecting the drying and separation by screening, either simultaneously or in any order of sequence, and finally extracting the sugar from the said separated parts by subjecting the dry products to the action of water in a suitable vessel and recovering the sugar from the solution.

GEORGE W. McMULLEN.
GEORGE BARRETT McMULLEN.

Witnesses:
CHARLES J. SCHMIDT,
NELLIE B. DEARBORN.